July 19, 1932.    O. W. THOMPSON    1,867,779
GAUGE AND THERMOMETER FITTING
Filed June 26, 1924
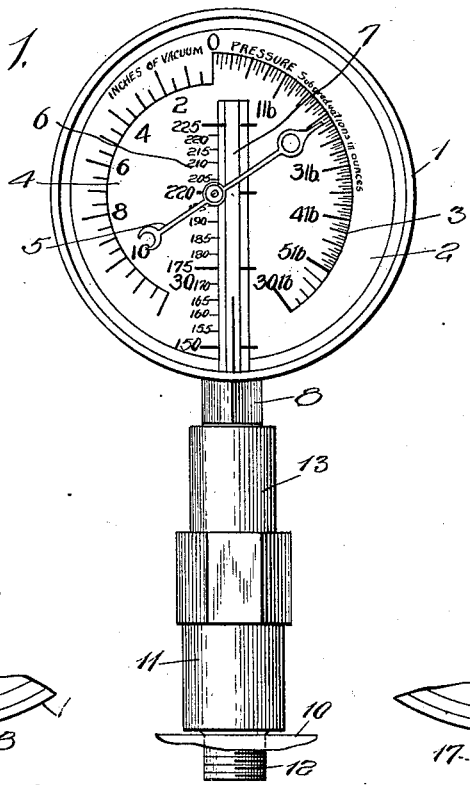
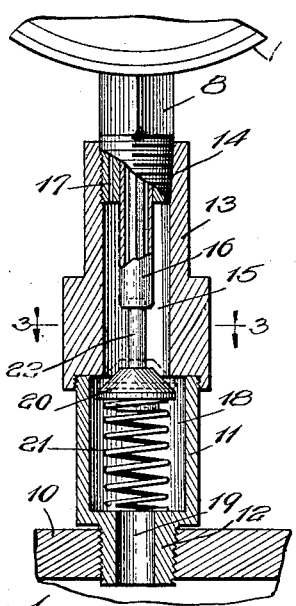
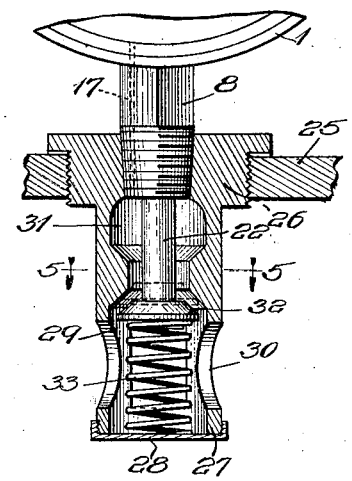
Witnesses:
W. T. Kilroy
Harry B. L. White
Inventor:
Orville W. Thompson,
By Hill & Hill
Attys Patented July 19, 1932

1,867,779

UNITED STATES PATENT OFFICE

ORVILLE W. THOMPSON, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

GAUGE AND THERMOMETER FITTING

Application filed June 26, 1924. Serial No. 722,556.

My invention belongs to that general class of devices known as boiler or like fittings such as shown and described in the patent issued to me September 11, 1928, No. 1,683,743, and relates more particularly to an attachment or fitting or attaching a gauge, whether pressure or vacuum, or a combined pressure and vacuum gauge, with or without a thermometer, to a boiler, tank or other container. The invention has among its objects the production of a device of the kind described which is simple, compact, reliable, efficient, convenient, and satisfactory for use wherever found applicable. More particularly it has as an object the production of a fitting adapted to facilitate the attaching of a gauge to a boiler without the necessity of the usual pet cock and fitting, and that is particularly adapted for the attachment of combined gauge and thermometer to a boiler or the like. More particularly it relates to an attachment adapted for the attachment of the combined instrument specified, in which it is not necessary to disassemble the parts in order to apply or remove the same from the boiler, and which is so constructed that it is likewise not necessary in the case of a hot water boiler or the like to remove the water, or in the case of a steam boiler, to reduce the pressure before the removal of the instrument. It has particularly as an object the production of a fitting that will permit the use of a protected thermometer, the parts being so arranged that the instrument will indicate accurately at all times. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawing, wherein like reference characters indicate like or corresponding parts:

Fig. 1 is a front elevation of my improved instrument and fitting;

Fig. 2 is a sectional view through the fitting;

Fig. 3 is a cross-sectional view taken substantially on line 3—3 of Fig. 2;

Fig. 4 is a sectional view of a modified construction; and

Fig. 5 is a sectional view taken substantially on line 5—5 of Fig. 4.

Referring to the drawing, 1 represents a gauge of suitable size and shape, provided with a dial 2 which is arranged as indicated at 3 and 4 to indicate the movement of the indicator 5 which, as shown, is in the form of a pointer or hand. The dial is also shown provided with the scale 6 to indicate readings from the thermometer tube 7 which projects through the fitting 8 or tubular extension on the gauge.

I have shown a portion of a boiler 10, it being understood that this represents any container, whether a steam boiler, hot water heater or boiler, or the like. The boiler is provided with a tapped opening and a tubular fitting 11 applied thereto, the same having a threaded extension 12 at the boiler end and of a size to fit the tapped opening through the boiler. The fitting 11 is provided with an extension 13 which, in the particular case illustrated, is attached thereto, the upper or outer end being threaded as indicated at 14 for engagement with the threaded tubular extension or fitting 8 on the gauge. As shown, part 13 is chambered as indicated at 15, and is adapted to receive an extension 16 on the part 8, this extension being tubular and enclosing the thermometer tube 7 projecting thereinto. The fitting 8 is also provided with a duct 17 therethrough which communicates with the fluid-controlled mechanism within the gauge, for example a Bourdon spring provided to actuate or control the indicator 5, indicating pressure, vacuum, or both. The part 11, as shown, is chambered as indicated at 18, and provided with a passage 19 communicating with the interior of the boiler 10. A valve 20 is provided for controlling communication between chamber 18 and chamber 15, a spring 21 tending to normally move the valve to its closed position as indicated in the dotted lines in Fig. 2. If the thermometer casing 16 is not of sufficient length to engage the valve, the valve may be provided with an extending post 22 arranged to cooperate and engage with the part 16 before the gauge is screwed down, so that when the gauge is finally turned to its final position, the valve 20 will be opened, as indicated in Fig. 2. Steam or hot water, or whatever it may be, may pass through the port 19 through the chamber 18 and chamber 15 and through the duct 17 to the mechanism of the gauge.

The temperature of the steam or water, or whatever it may be, is indicated by the thermometer, the heat being transmitted or conducted through the walls of the casing 16 to the thermometer bulb. If the gauge is removed by screwing off from the fitting 13, the pressure in the tank or boiler, as well as the spring 21, will cause the valve 20 to be seated, preventing the escape of any steam or water or other fluid from the boiler. The part 16 may be arranged centrally of the part 8 or at one side, so long as the same will clear the walls of the part 13 when the gauge is applied or removed. It is not necessary to disassemble the gauge or remove the thermometer to apply or remove the instrument. It is likewise unnecessary to lower the pressure in the boiler, or in the case of a fluid in the boiler, to withdraw the same or lower the level to prevent its escape when the instrument is removed, as the valve will automatically close the opening and prevent such escape. This particular type of fitting illustrated is very convenient, and it will be noted that the same does not require a large tapped opening in the boiler, the same being no larger than would be required to receive the fitting part 8.

A slightly modified construction is shown in Fig. 4, in which a somewhat larger tapped opening in the boiler is required. In this case, 1 represents the instrument provided with the tubular extension 8, having a thermometer tube and casing 22 projecting therefrom and provided with a fluid duct 17. In this case, 26 represents a fitting part arranged for engagement with the tapped opening in the boiler, the same having a part 27 projecting into the boiler which may be closed at the end, as indicated at 28, in any suitable manner desired, or left with ports as the case may be. As shown, the same is formed with chambers 29 and 31, 32 being a valve for controlling the passage of fluid from chamber 29 into chamber 31, from which it may pass to or from the instrument. The fitting in this instance is provided with one or more openings 30 about the same through which the fluid may freely pass to chamber 31, a spring 33 tending to normally maintain the valve closed when the instrument is removed. This fitting operates similarly to the other, one of its advantages being that the thermometer within the part 22 is actually projected within the boiler or tank with less opportunity for the same to be affected by the outside temperature, as might be the case with the fitting shown in Fig. 2. Where it is not desired to use as large a relative opening in the boiler as shown in this construction, the other construction does not have this disadvantage.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a device of the class described, the combination of a temperature thermometer and gauge combined in a single instrument casing, having an extended fitting enclosing the thermometer bulb, an attachment for securing both to a boiler through a single opening, the gauge being in communication through the attachment with the interior of the boiler, said attachment being constructed to permit the insertion of the encased bulb of the temperature thermometer in contact with the contents of the boiler simultaneously with the operative attachment of the gauge fitting thereto without disassociation of the thermometer from the gauge construction, and means entirely enclosed in the attachment for preventing the escape of the contents of the boiler upon removal of the gauge from the attachment.

2. In a device of the class described, the combination of a fitting and a combined pressure gauge and thermometer, the fitting and gauge having means for holding the gauge and thermometer relatively to said fitting and having means for connecting said fitting with an element with which the gauge, and fitting are adapted to communicate, said fitting having a valve and means disposed therein for normally holding the valve closed, means providing a casing for the thermometer, said casing being simultaneously movable into functionally engaging position with said valve when said gauge is connected and held with relation to said fitting to thereby hold said valve open.

In testimony whereof, I have hereunto signed my name.

ORVILLE W. THOMPSON.